W. H. SUMMERS.
VEHICLE PROPELLING MECHANISM.
APPLICATION FILED NOV. 8, 1907.
915,058.
Patented Mar. 9, 1909.
4 SHEETS—SHEET 3.
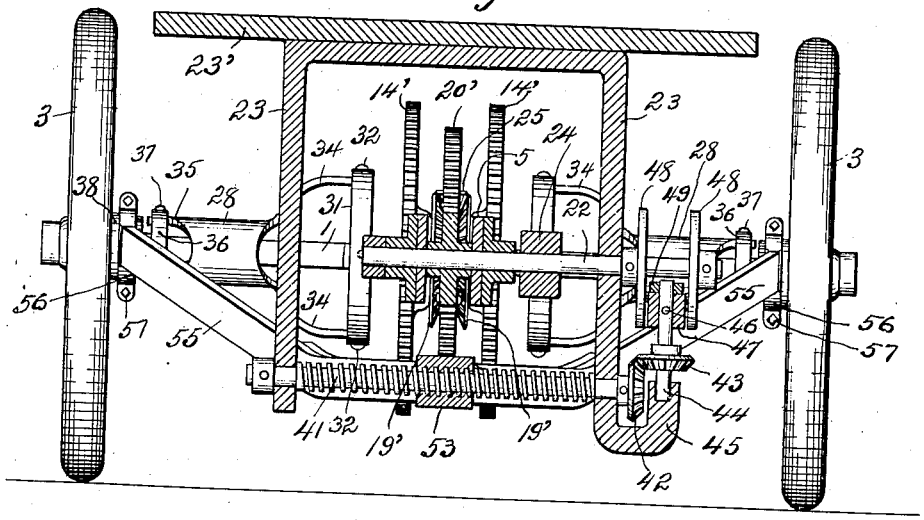
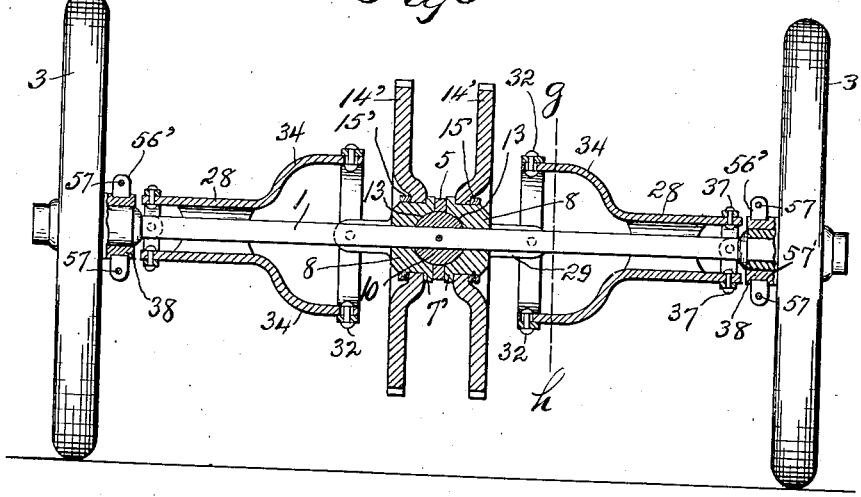
WITNESSES:
R. E. Hamilton
E. B. House
INVENTOR.
William H. Summers
BY
Warren D. House
His ATTORNEY.

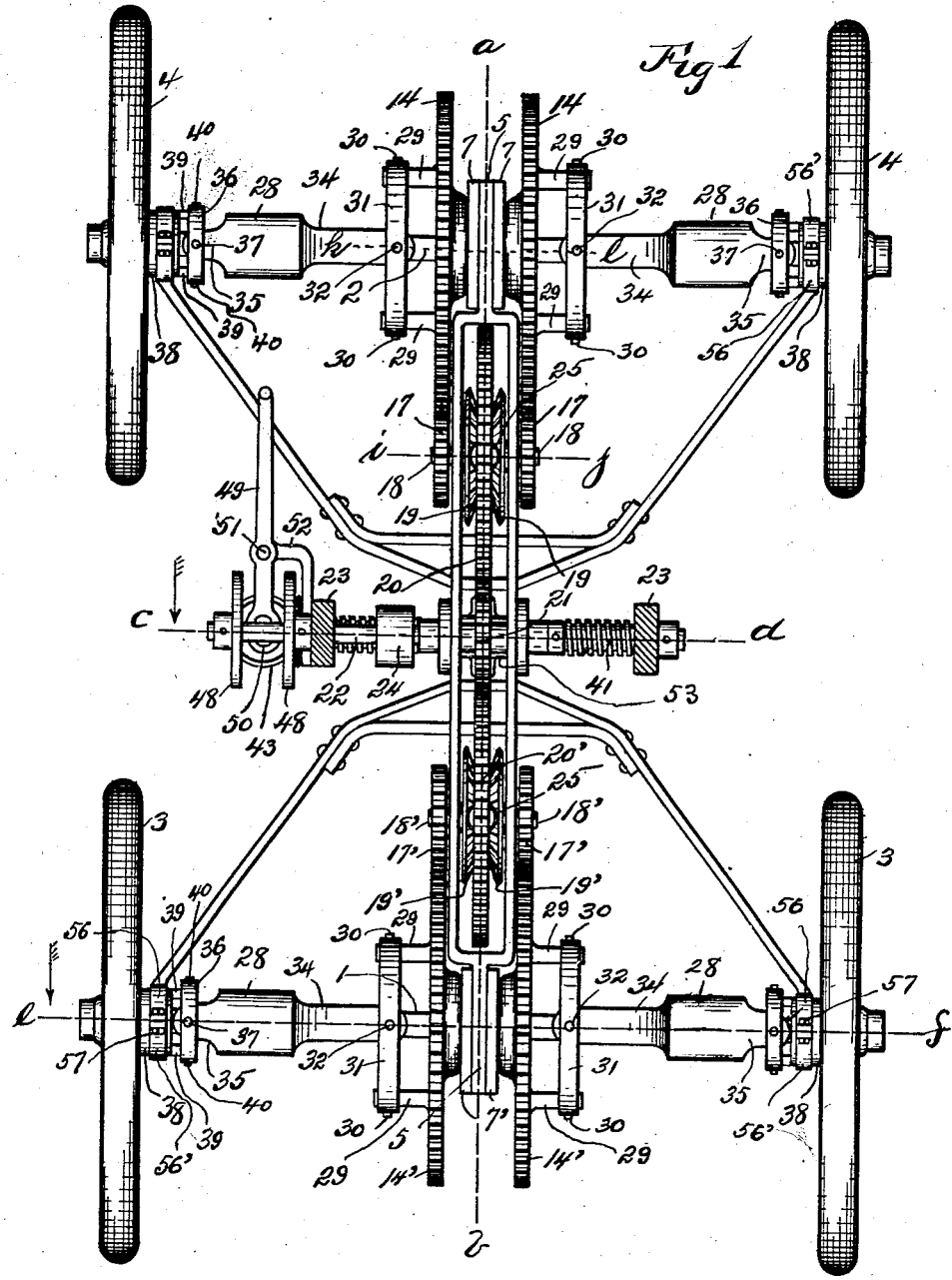

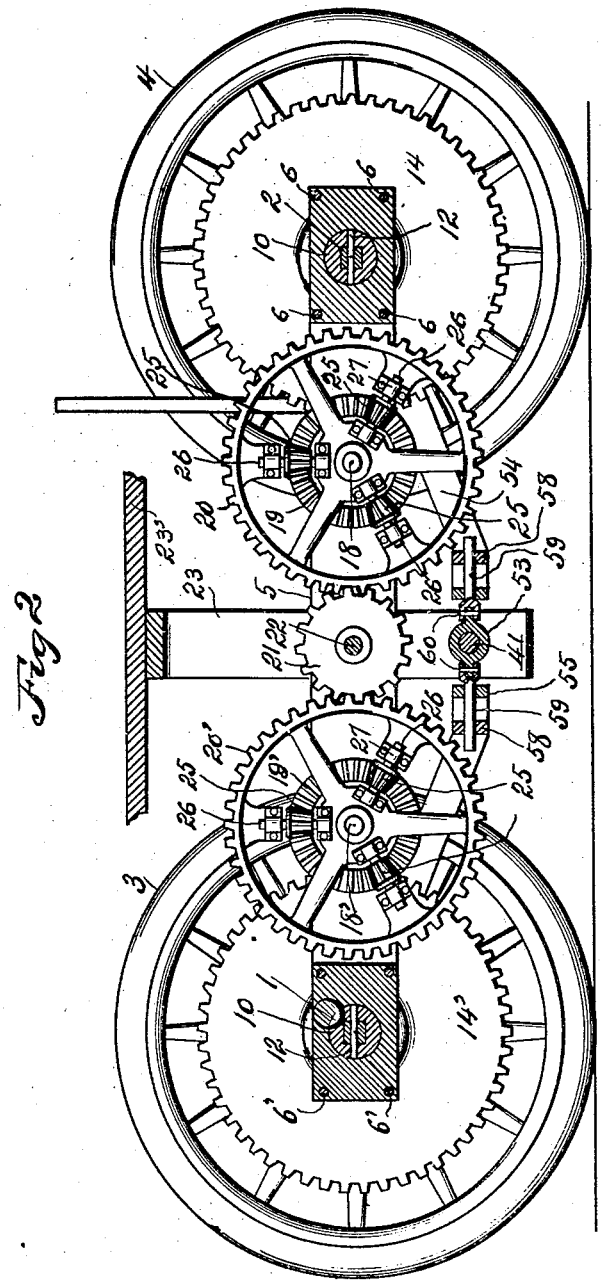

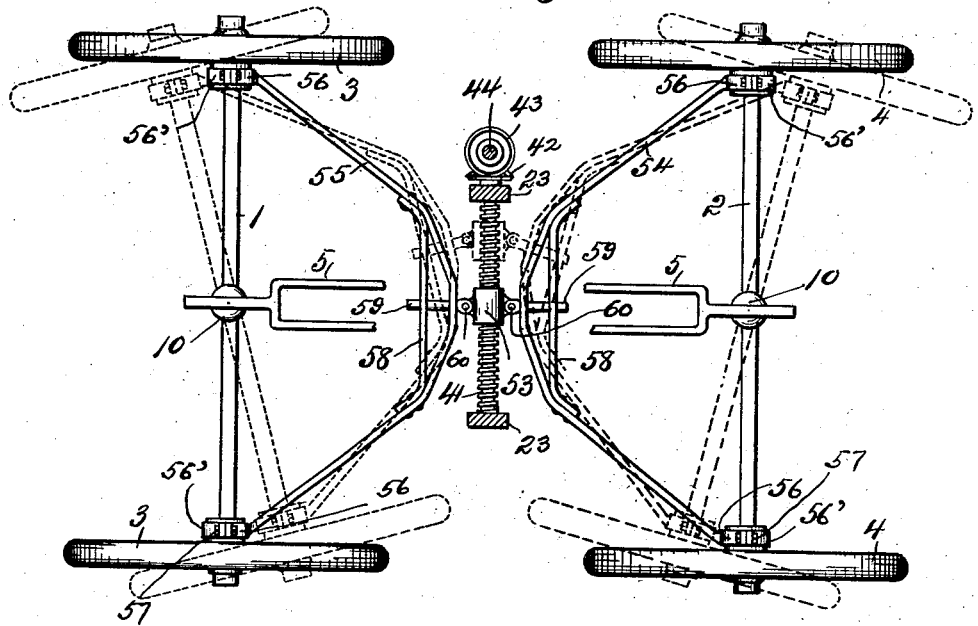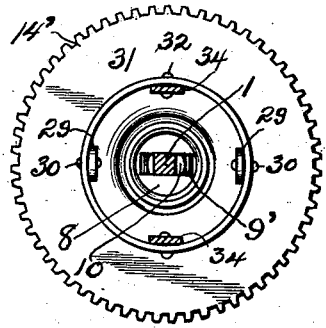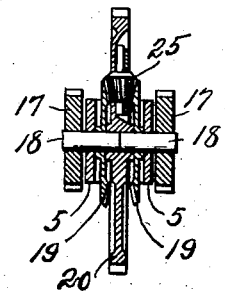

UNITED STATES PATENT OFFICE.

WILLIAM H. SUMMERS, OF WORLAND, MISSOURI.

VEHICLE-PROPELLING MECHANISM.

No. 915,058.  Specification of Letters Patent.  Patented March 9, 1909.

Application filed November 8, 1907. Serial No. 401,291.

*To all whom it may concern:*

Be it known that I, WILLIAM H. SUMMERS, a citizen of the United States, residing at Worland, in the county of Bates and State of Missouri, have invented certain new and useful Improvements in Vehicle-Propelling Mechanisms, of which the following is a specification.

My invention relates to improvements in vehicle propelling mechanisms. The object of my invention is to provide a vehicle, such as an automobile, in which manually controlled steering mechanism is actuated by the power employed to propel the vehicle. My invention provides further, novel means for applying the driving power to all four wheels of the vehicle.

The novel features of my invention are hereinafter fully described and claimed.

In the accompanying drawings illustrative of my invention—Figure 1 is a view partly in plan and partly in horizontal section, showing a vehicle equipped with my invention. Fig. 2 is a vertical section on the line *a—b* of Fig. 1. Fig. 3 is a perspective of one of the collars, such as is affixed to the hub of each carrying wheel. Fig. 4 is an end elevation of one of the spherical collars or bearings which are mounted on the front and rear axles. Fig. 5 is a vertical section taken on the dotted line *c—d* of Fig. 1. Fig. 6 is a vertical section on the line *e—f* of Fig. 1. Fig. 7 is a view partly in plan and partly in horizontal section of the two axles, carrying wheels and steering mechanism, two positions of the several parts being indicated by solid and dotted lines respectively. Fig. 8 is a vertical section on the dotted line *g—h* of Fig. 6. Fig. 9 is a vertical section on the dotted line *i—j* of Fig. 1. Fig. 10 is a vertical section taken on the dotted line *k—l* of Fig. 1.

Similar characters of reference denote similar parts.

1 and 2 denote the rear and front axles and 3 and 4 four carrying wheels rotatively mounted on the rear and front axles respectively. A horizontal frame 5 has pivoted thereon, in the manner hereinafter described, the two axles 1 and 2. Secured upon opposite sides of the forward end of the frame 5 by transverse bolts 6, are two rectangular plates 7, each provided with an outwardly extending, central annular flange 8, encircling an outwardly flaring, central, transverse hole 9. On the axle 2 is mounted a spherical collar or bearing block 10, provided with an axial rectangular hole 11, in which the axle 2 is fitted. A similar collar 10 is similarly mounted on the axle 1. The collars 10 are secured respectively to the axles 1 and 2 by the transverse pins 12. In the forward and rear ends of the frame 5 are provided transverse openings for receiving the spherical collars 10. The plates 7 are provided with spherical seats 13 on the sides adjacent the frame 5 to receive the forward spherical collar 10. Upon opposite sides of the rear end of the frame 5 are secured by bolts 6', two plates 7', each of which is provided with a spherical seat 13 to receive the spherical collar 10, mounted on the rear axle 1. The plates 7', as is illustrated in Fig. 8, are provided each with a horizontal, flaring hole 9', which permits the rear axle 1 to swing in a horizontal plane in the plates 7'.

By reason of the flaring shape of the hole 9 in each plate 7 the front axle 2 is capable of being swung on the front spherical collar 10 in two planes at right angles to each other. The plates 7 have mounted upon their annular flanges 8 two rotary members comprising preferably two spur gear wheels 14 which are held in position by means of two collars 15 secured to said flanges by any suitable means. Meshing with the spur gears 14 respectively are two pinions 17, rigidly secured respectively to two horizontal shafts 18 disposed in axial alinement with each other and rotatively mounted in transverse openings provided in the frame 5. Secured respectively on the inner ends of the shafts 18 are two bevel gear wheels 19 between which is disposed a spur gear wheel 20 which is rotatively mounted on the inner ends of the shafts 18, and meshes with a pinion 21. Secured on and rotatable with a horizontal shaft 22, rotatively mounted in transverse openings provided in the vertical arms 23 of a U-shaped bracket, the horizontal portion of which is secured to the underside of the wagon box 23'. The shaft 22 is a rotary driving shaft and has secured upon it a pulley 24 by which the shaft is rotated, the pulley being driven by a belt, not shown, connected with a motor, not shown, which is carried by the vehicle. Rotatively mounted on the annular flanges 8 of the plates 7' are two rotary members, preferably spur gears 14', which are held in position on said flanges by collars 15', shown in Fig. 6. The gears 14' mesh with pinions 17' secured upon and rotative with two horizontal shafts 18', to which are secured respectively two bevel gear wheels 19'. Rotatively mounted on the inner ends of the shafts 18' and intermediate the bevel gears 19', is a spur gear 20' which meshes with the pinion 21.

As shown in Fig. 2 each spur gear 20 and 20' has secured to it three bearings 27 in which are respectively rotatively mounted three radial shafts 26, on which are rigidly secured respectively, three bevel pinions 25. The three bevel pinions 25 carried by the spur gear wheel 20, are disposed between and mesh with the bevel gear wheels 19, while the three bevel pinions 25, carried on the spur gear 20', are located between and mesh with the bevel gears 19'.

When the driving shaft 22 is rotated it will transmit rotation to the pinion 21, spur gears 20 and 20' and through the bevel pinions 25 rotation will be transmitted to the bevel gear wheels 19 and 19'. The shafts 18 and 18' will thus be rotated, thereby respectively rotating the pinions 17 and 17', which in turn will respectively rotate in a like direction the spur gears 14 and 14'.

The gearing just described is of the ordinary differential type and permits the gears 14 and gears 14' to rotate one faster or slower than the other when the vehicle is rounding a curve. The gear wheels 14 and the gear wheels 14' are connected respectively with the carrying wheels 4 and 3 by flexible driving mechanism which will permit the free swinging of the two axles 1 and 2. Between each carrying wheel 4 and the adjacent spur gear 14, and between each wheel 3 and spur gear 14' is mounted a rectangular, tubular driving member 28, through which the adjacent axle, 1 or 2, as the case may be, extends.

Upon diametrically opposite sides of the axle 2 each spur gear wheel 14 is provided with two outwardly extending horizontal lugs 29, which are pivoted to the inner side of a vertical ring 31, by means of transverse pins 30. Each ring 31 at diametrically opposite sides and at right angles to the pin 30, are provided with transverse holes in which are secured pins 32, which extend through the ring 31 and are located in slots provided one in the inner end of each of two arms 34 with which each driving member 28 at its inner end is provided.

Each spur gear 14' on its outer side is provided with two horizontal projections 29, such as are provided on the spur gears 14, said projections being pivoted by transverse pins 30 to diametrically opposite sides of a vertical ring 31, encircling the shaft 1 and pivoted to the arms 34 of the driving member 28 by pins 32 disposed at right angles to the pins 30.

Each driving member on both axles 1 and 2, is provided at its outer end with two parallel outwardly extending arms 35, which are pivoted to diametrically opposite sides of a vertical ring 36 by transverse pins 37. Upon the hub of each wheel 3 and 4, and at the inner side of the wheel is secured a collar 38, which is provided with two inwardly extending lugs 39, pivoted by means of transverse pins 40 to diametrically opposite sides of the adjacent ring 36 and at right angles to the pins 37.

From the above description it will be seen that a universal joint connection is made between the outer end of each driving member 28 and the adjacent carrying wheel and between the inner end of each member 28 and the adjacent spur gear 14 or 14', as the case may be. The axle 1 may thus be swung horizontally and the axle 2 vertically and horizontally without interfering with the driving of the carrying wheels.

I will now describe the steering mechanism:—Directly below and parallel with the driving shaft 22 is a screw threaded shaft 41 which is rotatively mounted in the arms 23 and has secured to it at one end a bevel gear 42 which meshes with the bevel gear 43 secured upon and rotatable with a vertical shaft 44 the lower end of which is rotatively mounted in a vertical hole provided in the upper end of the vertical portion of a right angled extension to the lower end of one of the arms 23, said right angled extension being denoted by 45. Secured to the shaft 44 by a transverse pin 46 is a roller 47, located between two friction disks 48 rigidly secured to and rotatable with the shaft 22. When it is designed to run the vehicle straight ahead the shaft 44 is disposed vertically with the rollers 47 secured thereto out of contact with either of the two friction disks 48. In order that rotation be imparted to the shaft 44 and thereby to the shaft 41 through the intermediacy of the gears 42 and 43, the lower end of the shaft 44 is loosely mounted in the projection 45 so that the upper end of the shaft 44 may be swung laterally into contact with either of the two friction disks 48. To alternately swing said shaft 44 into frictional contact with the two friction disks 48 the upper end of said shaft is extended through a vertical slot 50 provided in one end of a horizontal lever 49 pivoted by a vertical bolt 51 to a horizontal bracket 52, secured on the adjacent vertical arm of the bracket 23. By swinging the lever 49 laterally in both directions the upper end of the shaft 44 may be swung so as to alternately force the roller 47 against the friction disks 48. By this means rotation of the shaft 22 will be transmitted alternately in opposite directions to the screw threaded shaft 41.

Mounted on the screw threaded portion of the shaft 41 is a nut 53, which, when the shaft 41 is rotated, is caused to move lengthwise on said shaft in a direction depending upon the direction of rotation of said shaft. Disposed on opposite sides of the nut 53 are two horizontal yokes 54 and 55. Each end of each of said yokes has a semi-circular portion 56 which is located in a peripheral groove 57', provided one in each collar 38. In each groove 57' is also located a curved clamping plate 56', which is secured by bolts 57 to the adjacent end of the adjacent semi-circular portion 56. The collars 38 may freely rotate between the semi-circular portions 56 of the yokes and the curved plates 56'. Each yoke 54 and 55 is provided with a transverse horizontal brace 58 having a transverse hole through which extends a longitudinal horizontal pin 59 which also extends through a transverse horizontal opening in the middle portion of each yoke. There are thus two pins, 59, which are pivotally connected by vertical bolts 60 with opposite sides of the nut 53. The bolts 59 are slidable endwise in the openings in the yokes 54 and 55 and by reason of their pivotal connection with the nut 53 the said bolts or pins 59 will swing the yokes 54 and 55 horizontally in opposite directions when the nut 53 is moved lengthwise of the shaft 41.

In order to steer the vehicle to the right or left it is but necessary to swing the lever 49 in the proper direction so as to have the roller 47 engage the proper friction disk 48. The rotation of the shaft 22 will thus rotate the shaft 44 and threaded shaft 41, as has already been described. The shaft 41 in rotating will force the nut 53 endwise on the threaded shaft in a direction such that the yokes 54 and 55 will be swung so as to swing the axles 2 and 1, respectively, in the proper directions.

Various modifications of my invention within the scope of the appended claims may be made without departing from its spirit.

Having thus described my invention, what I claim and desire to secure by Letters Patent is:—

1. In a vehicle propelling mechanism, the combination with a vehicle frame, of an axle pivoted to swing horizontally on said frame, two carrying wheels mounted on said axle, two rotary members encircling said axle, means for imparting rotation to said rotary members, two flexible driving means connecting said rotary members with said carrying wheels respectively, and manually controlled means, actuated by said rotation imparting means, for swinging said axle.

2. In a vehicle propelling mechanism, the combination with a vehicle frame, of two axles pivoted to said frame, four carrying wheels mounted two on each axle, four rotary members mounted two on each axle, flexible driving means respectively connecting said rotary members and said carrying wheels, a rotary shaft, means for imparting rotation to said rotary members from said shaft, and manually controlled means actuated by said rotary driving shaft for simultaneously swinging said axles in opposite directions.

3. In a vehicle propelling mechanism, the combination with a vehicle frame, of an axle pivoted to said frame, two carrying wheels mounted on said axle, two rotary members mounted on said axle, flexible driving means connecting said rotary members and said carrying wheels respectively, a rotary driving shaft, means for transmitting rotation from said driving shaft to said rotary members, a screw threaded shaft, manually controlled means for transmitting rotation in opposite directions from said driving shaft to said screw threaded shaft, a nut engaging said screw threaded shaft, and means by which said axle is swung when said nut is moved lengthwise of said screw threaded shaft.

4. In a vehicle propelling mechanism, the combination with a vehicle frame, of two axles pivoted to said frame, four carrying wheels mounted two on each axle, flexible driving means connected respectively to said carrying wheels, four rotary members mounted two on each axle and connected with said flexible driving means respectively, a rotary driving shaft, means for transmitting rotation from said driving shaft to said four rotary members, a rotary screw threaded shaft, manually controlled means for transmitting rotation in opposite directions from said driving shaft to the screw threaded shaft, a nut engaging said screw threaded shaft, and means by which said axles are swung simultaneously in opposite directions when said nut is moved lengthwise of said screw threaded shaft.

5. In a vehicle propelling mechanism, the combination with a vehicle frame, of an axle pivoted to said frame, two carrying wheels mounted on said axle, two rotary members on said axle, flexible driving means connecting said rotary members and said carrying wheels respectively, a rotary driving shaft, differential gearing for transmitting rotation from said driving shaft to said rotary members, and manually controlled means actuated by said rotary driving shaft for swinging said axle.

6. In a vehicle propelling mechanism, the combination with a vehicle frame, of two axles pivoted thereon, four carrying wheels mounted two on each axle, four rotary members mounted two on each axle, differential gearing for transmitting rotation from a rotary driving shaft to said rotary members, flexible driving means connecting said rotary members and said carrying wheels respectively, and manually controlled means actuated by said rotary driving shaft for simultaneously swinging said axles in opposite directions.

7. In a vehicle propelling mechanism, the combination with two axles, of four carrying wheels rotatively mounted, two on each of said axles, means connecting said axles and to which one axle is pivoted so as to be swung in two planes at right angles to each other, two rotary members encircling the pivoted axle, two flexible driving mechanisms for imparting rotation respectively from said two rotary members to the carrying wheels mounted on the pivoted axle, and means for rotating in a like direction independently of each other said two rotary members.

8. In a vehicle propelling mechanism, the combination with two axles, of four carrying wheels rotatively mounted, two on each of said axles, means connecting said axles and to which one axle is pivoted so as to be swung in two planes at right angles to each other, two rotary members encircling the pivoted axle, two flexible driving mechanisms for imparting rotation from said two rotary members respectively to the carrying wheels mounted on the pivoted axle, a rotary driving shaft, and means actuated by said driving shaft for rotating independently of each other in a like direction said two rotary members.

9. In a vehicle propelling mechanism, the combination with a front and a rear axle, of four carrying wheels rotatively mounted, two on each of said axles, means connecting said axles and to which the front axle is pivoted so as to be swung in two planes at right angles to each other, two rotary members encircling the front axle, two flexible driving mechanisms for imparting rotation from said two rotary members respectively to the carrying wheels mounted on the front axle, a rotary driving shaft, means actuated by said shaft for imparting rotation in a like direction and independently of each other to the carrying wheels mounted on the rear axle, and means actuated by said driving shaft for rotating in a like direction and independently of each other said two rotary members.

10. In a vehicle propelling mechanism, the combination with a front and a rear axle, of four carrying wheels rotatively mounted, two on each of said axles, means connecting said axles and to which the front axle is pivoted so as to be swung in two planes at right angles to each other, two rotary members encircling the front axle, two flexible driving means for respectively imparting rotation from said two rotary members to the carrying wheels on the front axle, a common driving means, and means actuated by said common driving means for rotating in a like direction and independently of each other said two rotary members.

11. In a vehicle propelling mechanism, the combination with a vehicle frame, of an axle pivoted to said frame so as to be swung in planes at right angles to each other, two carrying wheels mounted on said axle, two rotary members encircling said axle and supported by said frame, two flexible driving means respectively connecting said rotary members with said carrying wheels, and means for imparting rotation to said rotary members.

12. In a vehicle propelling mechanism, the combination with a vehicle frame, of an axle pivoted to said frame so as to be swung in two planes at right angles to each other, two carrying wheels rotatively mounted on said axle, two rotary members encircling said axle and supported by said frame, two flexible driving means connecting said rotary members with said carrying wheels respectively, and means for rotating said two rotary members in a like direction and independently of each other.

13. In a vehicle propelling mechanism, the combination with a vehicle frame, of an axle pivoted to said frame so as to be swung in two planes at right angles to each other, two carrying wheels rotatively mounted on said axle, two rotary members encircling said axle and supported by said frame, means for rotating said two rotary members in a like direction, and two flexible driving means respectively connecting said rotary members with said carrying wheels.

14. In a vehicle propelling mechanism, the combination with a vehicle frame, of a vehicle axle, a spherical collar encircling said axle and revolubly mounted in said frame, two carrying wheels rotatively mounted on said axle, and means for rotating said vehicle wheels independently of each other in a like direction.

15. In a vehicle propelling mechanism, the combination with a vehicle frame, of a vehicle axle, a spherical collar encircling said axle and revolubly mounted in said frame, two rotary members encircling said axle and supported by said frame, two carrying wheels rotatively mounted on said axle, means for rotating said rotary members, and two driving means connecting said rotary members with said carrying wheels respectively.

16. In a vehicle propelling mechanism, the combination with a vehicle frame, of a vehicle axle, a spherical collar encircling said axle and revolubly mounted in said frame, two carrying wheels rotatively mounted on said axle, two rotary members encircling said axle and supported by said frame, means for rotating said two rotary members in a like direction and independently of each other, and two driving means connecting said rotary members with said carrying wheels respectively.

17. In a vehicle propelling mechanism, the combination with a vehicle frame, of a vehicle axle, a spherical collar encircling said axle and revolubly mounted in said frame, two rotary members encircling said axle and supported by said frame, two carrying wheels rotatively mounted on said axle, and two flexible driving means respectively connecting said rotary members and said carrying wheels.

18. In a vehicle propelling mechanism, the combination with a vehicle frame, of a vehicle axle, two carrying wheels rotatively mounted on said axle, a spherical bearing for said axle rotatively mounted in said frame, two rotary members encircling said axle and supported by said frame, two driving members connected by universal joints respectively to the carrying wheels and to said two rotary members.

19. In a vehicle propelling mechanism, the combination with a vehicle frame, of a vehicle axle connected by a ball and socket joint with said frame, two carrying wheels rotatively mounted on said axle, two rotary members encircling said axle and supported by said frame, two driving members connected by universal joints respectively to said carrying wheels and to said rotary members, and means for rotating said two rotary members in a like direction independently of each other.

20. In a vehicle propelling mechanism, the combination with a vehicle frame, of a vehicle axle, a spherical bearing on said axle revolubly mounted in said frame, two rotary members encircling said axle and supported by said frame, two carrying wheels rotatively mounted on said axle, two driving members connected by universal joints respectively to said carrying wheels and to said rotary members, a rotary driving shaft, and means for transmitting rotation from said driving shaft to said rotary members.

21. In a vehicle propelling mechanism, the combination with a vehicle frame, of front and rear axles connected to said frame, the front axle being pivotally connected with the frame so as to swing in two planes at right angles to each other, four carrying wheels rotatively mounted two on the front and two on the rear axles, two rotary members encircling the front axle and supported by said frame, two flexible driving means respectively connecting said rotary members with said carrying wheels which are on the front axle, gear wheels secured respectively to the rear carrying wheels and carried thereby, and means for imparting rotation to said rotary members and to said gear wheels.

In testimony whereof I have signed my name to this specification in presence of two subscribing witnesses.

WILLIAM H. SUMMERS.

Witnesses:
 E. B. HOUSE,
 T. H. VAN DYKE.